US011831093B2

(12) United States Patent
Traverso et al.

(10) Patent No.: US 11,831,093 B2
(45) Date of Patent: Nov. 28, 2023

(54) SOCKET LOCATOR

(71) Applicant: Cisco Technology, Inc., San Jose, CA (US)

(72) Inventors: Matthew J. Traverso, Saratoga, CA (US); Sandeep Razdan, Burlingame, CA (US); Joyce J. M. Peternel, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 17/645,195

(22) Filed: Dec. 20, 2021

(65) Prior Publication Data

US 2022/0320765 A1 Oct. 6, 2022

Related U.S. Application Data

(60) Provisional application No. 63/200,811, filed on Mar. 30, 2021.

(51) Int. Cl.
*H01R 12/70* (2011.01)
*G02B 6/38* (2006.01)

(52) U.S. Cl.
CPC ....... *H01R 12/7005* (2013.01); *G02B 6/3817* (2013.01)

(58) Field of Classification Search
CPC ............ H01R 12/7005; H01R 12/7052; H01R 12/724; H01R 12/7011; G02B 6/3817
USPC ..................................................... 439/326, 65
See application file for complete search history.

(56) References Cited

U.S. PATENT DOCUMENTS

| 6,168,971 | B1* | 1/2001 | Love | H05K 3/303 |
| | | | | 438/106 |
| 8,690,593 | B2* | 4/2014 | Anderson | G02B 6/3807 |
| | | | | 439/660 |
| 8,968,019 | B2* | 3/2015 | Hack | H01R 12/7076 |
| | | | | 439/326 |
| 9,252,517 | B2* | 2/2016 | Kimura | H01R 12/85 |
| 9,651,745 | B2* | 5/2017 | Chou | G02B 6/4231 |
| 10,020,603 | B1* | 7/2018 | Liu | H01R 12/7064 |
| 10,317,430 | B2* | 6/2019 | Nagata | H01R 12/7005 |
| 10,355,428 | B2* | 7/2019 | Fang | H01R 12/7005 |
| 10,381,779 | B2* | 8/2019 | Zhou | H01R 12/79 |
| 10,673,181 | B2* | 6/2020 | Horii | H01R 13/422 |
| 10,763,606 | B1* | 9/2020 | Esmaily | H01R 13/5219 |
| 11,362,461 | B2* | 6/2022 | Tamaki | H01R 43/16 |
| 2005/0159034 | A1 | 7/2005 | Murayama et al. | |
| 2007/0141871 | A1* | 6/2007 | Scherer | H01R 13/6585 |
| | | | | 439/108 |
| 2007/0212919 | A1* | 9/2007 | Clayton | H01R 12/721 |
| | | | | 257/E23.098 |

(Continued)

OTHER PUBLICATIONS

Nikolaos Bamiedakis et al., "Optical Transceiver Integrated on PCB Using Electro-Optic Connectors Compatible with Pick-and-Pack Assembly Technology," ResearchGate, Dated Feb. 2010, pp. 1-12.

*Primary Examiner* — Marcus E Harcum
(74) *Attorney, Agent, or Firm* — Patterson + Sheridan, LLP

(57) ABSTRACT

An apparatus includes a substrate, a frame, and a socket. The frame defines a slot. The frame is coupled to the substrate such that the slot is aligned with an attachment location on the substrate. The socket receives a first device. The socket aligns with the attachment location on the substrate when the socket is inserted in the slot.

17 Claims, 7 Drawing Sheets

(56) References Cited

U.S. PATENT DOCUMENTS

| | | | |
|---|---|---|---|
| 2009/0264028 A1* | 10/2009 | Chuma | B23K 35/3613 |
| | | | 439/876 |
| 2012/0063728 A1 | 3/2012 | Yeh et al. | |
| 2012/0184137 A1* | 7/2012 | Patel | H01R 12/58 |
| | | | 439/607.01 |
| 2013/0157493 A1* | 6/2013 | Brown | E06B 3/66 |
| | | | 439/247 |
| 2014/0213115 A1* | 7/2014 | Kimura | H01R 24/60 |
| | | | 439/629 |
| 2018/0095228 A1 | 4/2018 | Rosenberg et al. | |
| 2019/0157783 A1 | 5/2019 | Leigh et al. | |
| 2019/0250341 A1* | 8/2019 | Giziewicz | G02B 6/4284 |
| 2019/0288440 A1* | 9/2019 | Ogura | H01R 13/113 |
| 2020/0127410 A1* | 4/2020 | Shioda | H01R 12/91 |
| 2020/0274269 A1* | 8/2020 | Teh | G06F 1/183 |
| 2020/0275587 A1* | 8/2020 | Chopra | H05K 7/2039 |
| 2021/0075134 A1* | 3/2021 | Yuan | H05K 1/184 |
| 2021/0111504 A1* | 4/2021 | Kobayashi | H01R 43/24 |
| 2022/0039269 A1* | 2/2022 | Zebhauser | H05K 9/0015 |
| 2022/0158373 A1* | 5/2022 | Komoto | H01R 12/592 |
| 2022/0320800 A1* | 10/2022 | Ikegami | H01R 13/6315 |
| 2022/0328991 A1* | 10/2022 | Sawairi | H01R 13/41 |
| 2023/0029463 A1* | 2/2023 | Chang | H01R 13/71 |

\* cited by examiner

SOCKET LOCATOR

CROSS-REFERENCE TO RELATED APPLICATIONS

This application claims benefit of U.S. provisional patent application Ser. No. 63/200,811 filed Mar. 30, 2021. The aforementioned related patent application is herein incorporated by reference in its entirety.

TECHNICAL FIELD

Embodiments presented in this disclosure generally relate to integrated circuits. More specifically, this disclosure relates to techniques for locating sockets for optical circuits (e.g., for co-packaged optics).

BACKGROUND

Sockets allow devices (e.g., optical circuits) to be properly aligned with other components. For example, a socket may be mounted onto a substrate (e.g., an application-specific integrated circuit (ASIC) substrate). A device may then be inserted into the socket to align the pads on the substrate with the pins of the device. The socket also allows the device to be removed or replaced without having to reflow solder.

Holes may be formed through the substrate to allow for proper positioning and alignment of the socket. Adding holes through the substrate, however, increases the manufacturing complexity. Additionally, as substrates grow larger, the holes reduce the mechanical integrity of the substrates, which may cause cracks or warpage.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, an apparatus includes a substrate, a frame, and a socket. The frame defines a slot. The frame is coupled to the substrate such that the slot is aligned with an attachment location on the substrate. The socket receives a first device. The socket aligns with the attachment location on the substrate when the socket is inserted in the slot. Other embodiments include methods for making the apparatus.

According to another embodiment, an apparatus includes a substrate, a socket, and at least one of epoxy or solder. The substrate defines a groove in a surface of the substrate. The socket receives a first device. The socket includes a peg. The socket aligns with an attachment location on the substrate when the peg mates with the groove. The epoxy or solder holds the peg in the groove. Other embodiments include methods for making the apparatus.

According to another embodiment, an apparatus includes a substrate, a first device, a frame, a socket, and a second device. The first device is coupled to the substrate. The frame defines a slot. The frame is coupled to the substrate such that the slot is aligned with an attachment location on the substrate. The socket is inserted in the slot such that the socket attaches to the attachment location on the substrate. The second device is inserted in the socket such that the second device is electrically connected to the first device. Other embodiments include methods for making the apparatus.

Example Embodiments

This disclosure describes techniques for aligning sockets with substrates. In a first technique, a frame attached to the substrate defines slots in which sockets may be inserted. The slots may include keying features that assist in properly aligning the sockets within the slots. When a socket is inserted in a slot in the frame, the socket may be properly aligned with an attachment location on the substrate. When a device (e.g., an optical circuit) is then inserted into the socket, the device may properly connect to the substrate (e.g., the pins of the device are aligned with and connect to pads at the attachment location on the substrate). In this manner, the frame properly aligns sockets and devices with the substrate without forming holes through the substrate, in particular embodiments.

In a second technique, grooves are formed in a top surface of the substrate. A socket includes pegs that mate with the grooves when the socket is properly aligned with an attachment location on the substrate. Epoxy or solder may hold the pegs within the grooves. When the socket is properly aligned with the substrate, a device (e.g., an optical circuit) may properly connect to the substrate when inserted into the socket (e.g., the pins of the device are aligned with and connect to pads at the attachment location on the substrate). As a result, the grooves and pegs align sockets and devices with the substrate without forming holes through the substrate, in particular embodiments.

Figure 1:
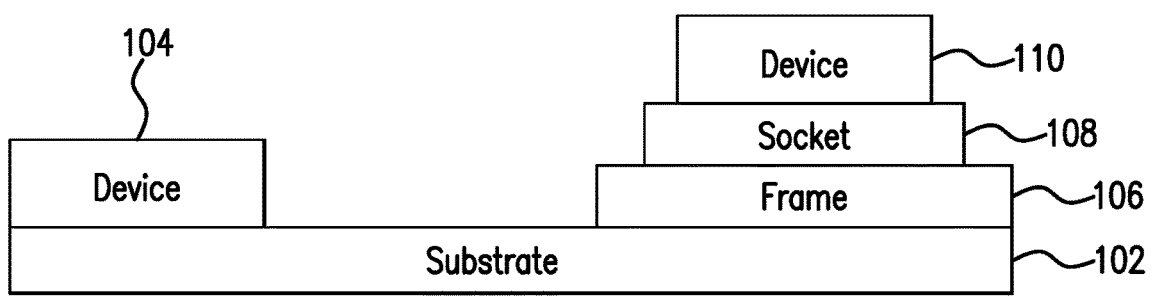
FIG. 1 illustrates an example system.

FIG. 1 illustrates an example system 100. As seen in FIG. 1, the system 100 includes a substrate 102, a device 104, a frame 106, a socket 108, and a device 110. Generally, the frame 106 aligns the socket 108 to the substrate 102 so that, when the device 110 is inserted in the socket 108, the device 110 forms an electrical connection with the device 104. In certain embodiments, the frame 106 aligns one or more sockets 108 onto the substrate 102 without forming holes through the substrate 102, which improves the mechanical integrity of the substrate 102. In certain embodiments, the system 100 is a co-packaged optic (CPO) device. For example, the device 104 may be an electrical switch die, and the device 110 may be an optical circuit that receives optical input. Both the switch die and the optical circuit are packaged on the same substrate 102. An electrical connection between the switch die and the optical circuit may be formed through or on the substrate 102.

The substrate 102 forms the foundation of the system 100. The substrate 102 may be formed of any suitable material. For example, the substrate 102 may be a semiconductor material, such as silicon. As another example, the substrate 102 may be made from plastic. In certain embodiments, the substrate 102 is an ASIC substrate for a CPO device. Various components (e.g., the device 104, the frame 106, the socket 108, and the device 110) may be connected to the substrate 102. For example, the device 104 may be soldered onto the substrate 102. As another example, the frame 106 may be adhered to the substrate 102 using epoxy or solder. As yet another example, the socket 108 may be connected to the substrate 102 by inserting the socket 108 into the frame 106. In some instances, the socket 108 may be epoxied or soldered to the substrate after inserting the socket 108 into the frame 106. As yet another example, the device 110 may be connected to the substrate 102 by inserting the device 110 into the socket 108. The frame 106 and the socket 108 align pins on the device 110 with pads on the substrate 102 such that the pins electrically connect to the pads.

In some embodiments, electrical connections (e.g., traces) are provided on or through the substrate 102. These connections or traces may terminate at pads on the surface of the substrate 102. By connecting devices to the pads, electrical connections may be made between the devices. For example, the device 104 and the device 110 may connect to the pads on the substrate 102. The device 104 may be soldered onto the pads, and the device 110 may connect to the pads when the device 110 is inserted into the socket 108. Electrical connections or traces may connect the pads to each other so that an electrical connection is created between the device 104 and the device 110. Electrical signals may then be communicated between the device 104 and the device 110 over these electrical connections.

The device 104 attaches to the substrate 102. For example, the device 104 may be an electrical switch die that is soldered onto the substrate 102 (e.g., in a CPO device). The device 104 may include solder bumps that are soldered onto pads on the surface of the substrate 102. By connecting the device 104 to the pads on the substrate 102, electrical connections to the device 104 may be made through or on the substrate 102. The device 104 may then communicate electrical signals to other components via these electrical connections. For example, if the device 104 is an electrical switch die and the device 110 is an optical circuit, the electrical connections may connect the electrical switch die and the optical circuit such that the electrical switch die and the optical circuit may communicate electrical signals to each other over the electrical connections.

The frame 106 (e.g., a plastic frame) attaches to the substrate 102 to provide alignment features for one or more sockets 108. The frame 106 may be attached to the substrate 102 using an adhesive, like epoxy or solder. In certain embodiments, the frame 106 defines one or more slots through which sockets 108 may be inserted or positioned. The slots align with attachment locations on the surface of the substrate 102. These attachment locations may include pads to which sockets 108 and devices 110 may connect. Additionally, the frame 106 may include keying features that assist in the proper alignment of sockets 108 that are inserted or positioned into the slots of the frame 106. In this manner, the frame 106 aligns the sockets 108 with the attachment locations on the surface of the substrate 102 without forming holes through the substrate 102, in particular embodiments. An example of the frame 106 is described using FIGS. 2A, 2B, and 2C.

One or more sockets 108 may be inserted within the frame 106 to be aligned with attachment locations on the surface of the substrate 102. In some embodiments, a socket 108 is sized and shaped to fit the device 110 such that when the device 110 is inserted into the socket 108, the socket 108 holds the device 110 to reduce the chances that the device 110 dislodges or falls out of the socket 108. For example, the socket 108 may include sidewalls that extend up the sides of the device 110 to hold the device 110 within the socket 108. The socket 108 includes receptacles that receive pins of the device 110. When the pins of the device 110 are inserted through the receptacles in the socket 108, the pins connect to the pads of the attachment location on the surface of the substrate 102. In this manner, the frame 106 and the socket 108 align the device 110 with the pads on the surface of the substrate 102 so that an electrical connection may be made between the device 104 and the device 110 on or through the substrate 102.

The device 110 may be inserted or positioned in the socket 108. The device 110 may include pins that connect to pads on the surface of the substrate 102. The frame 106 and the socket 108 align the pins of the device 110 to the pads on the substrate 102. When the pins of the device 110 are connected to the pads on the surface of the substrate 102, an electrical connection is formed between the device 104 and the device 110 through or on the substrate 102. In some embodiments, the device 110 is an optical circuit that transmits or receives optical signals. For example, the optical circuit may receive an optical signal and convert that optical signal into an electric signal. The optical circuit then communicates the electric signal to the device 104, which may be an electrical switch die, over the electrical connection formed between the device 104 and the device 110 on or through the substrate 102. As another example, the optical circuit may receive electric signals from the device 104. The optical circuit may convert the electric signals into optical signals and transmit the optical signals to an external system.

Figure 2A:
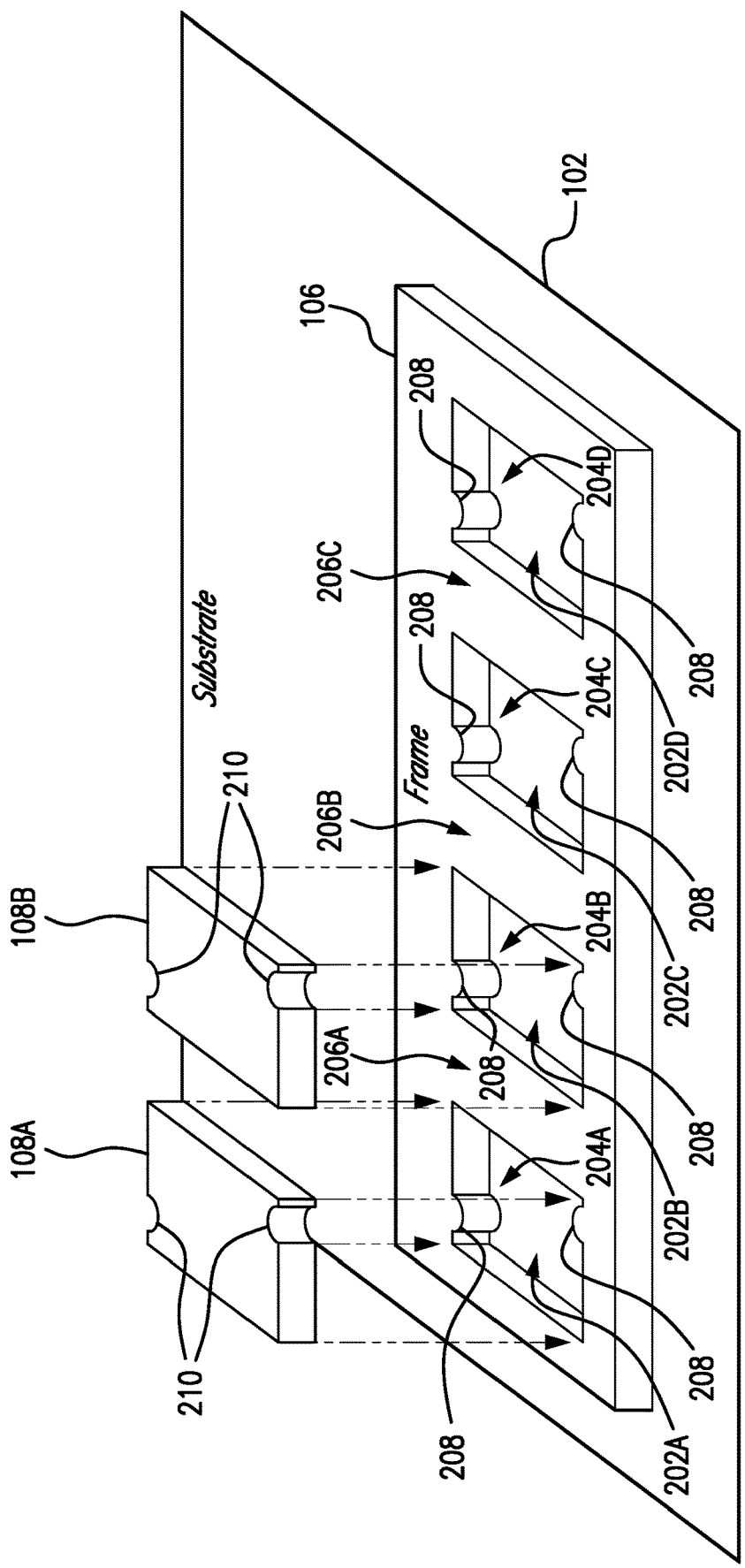
FIGS. 2A, 2B, and 2C illustrate an example socket locating technique used in the system of FIG. 1.

FIG. 2A illustrates an example socket locating technique used in the system 100 of FIG. 1. As seen in FIG. 2A, the frame 106 is attached to the substrate 102. The frame 106 may be attached to the substrate 102 using any suitable mechanism (e.g., epoxy or solder). The frame 106 defines one or more slots 202 in which sockets 108 may be inserted and positioned. In the example of FIG. 2A, the frame 106 defines slots 202A, 202B, 202C, and 202D. Each of the slots 202 are aligned with an attachment location 204 on the substrate 102. In the example of FIG. 2A, the slot 202A is aligned with the attachment location 204A. The slot 202B is aligned with the attachment location 204B. The slot 202C is aligned with the attachment location 204C. The slot 202D is aligned with the attachment location 204D. As explained previously, the attachment locations 204 may include pads on the surface of the substrate 102. Furthermore, the frame 106 includes rails 206 that physically separate the slots 202 from each other. In the example of FIG. 2A, the frame 106 includes a rail 206A that separates the slots 202A and 202B, a rail 206B that separates the slots 202B and 202C, and a rail 206C that separates the slots 202C and 202D. In certain embodiments, the rails 206 have a width of 0.5 millimeters.

Additionally, in the example of FIG. 2A, the sockets 108A and 108B are inserted or positioned within the slots 202A and 202B to align the sockets 108A and 108B with the attachment locations 204A and 204B. The frame 106 also includes keying features that assist in aligning the sockets 108A and 108B in the slots 202A and 202B. As seen in the example of FIG. 2A, the frame 106 includes protrusions 208 into the slots 202. Each protrusion 208 extends into a portion of a slot 202. Additionally, the sockets 108A and 108B define notches 210 that extend into the sockets 108A and 108B. The notches 210 in the sockets 108A and 108B align with the protrusions 208 of the frame 106. As a result, when the sockets 108A and 108B are properly positioned in the slots 202A and 202B, the protrusions 208 that extend into the slots 202A and 202B align with the notches 210 defined by the sockets 108A and 108B. If the sockets 108A and 108B are not properly positioned within the slots 202A and 202B (e.g., if the sockets 108A and 108B are rotated 90 degrees or if the sockets 108A and 108B are flipped), the protrusions 208 will not align with the notches 210. In this manner, the protrusions 208 and the notches 210 assist in the proper alignment of the sockets 108 in the slots 202. Thus the protrusions 208 and the notches 210 align the pads in the attachment locations 204 with receptacles in the sockets 108. When devices 110 are inserted or positioned within the sockets 108A and 108B, the pins of the devices 110 connect with the pads of the attachment locations 204A and 204B. In this manner, the frame 106 and the slots 202 properly align sockets 108 with attachment locations 204 on the substrate 102.

Figure 2B:
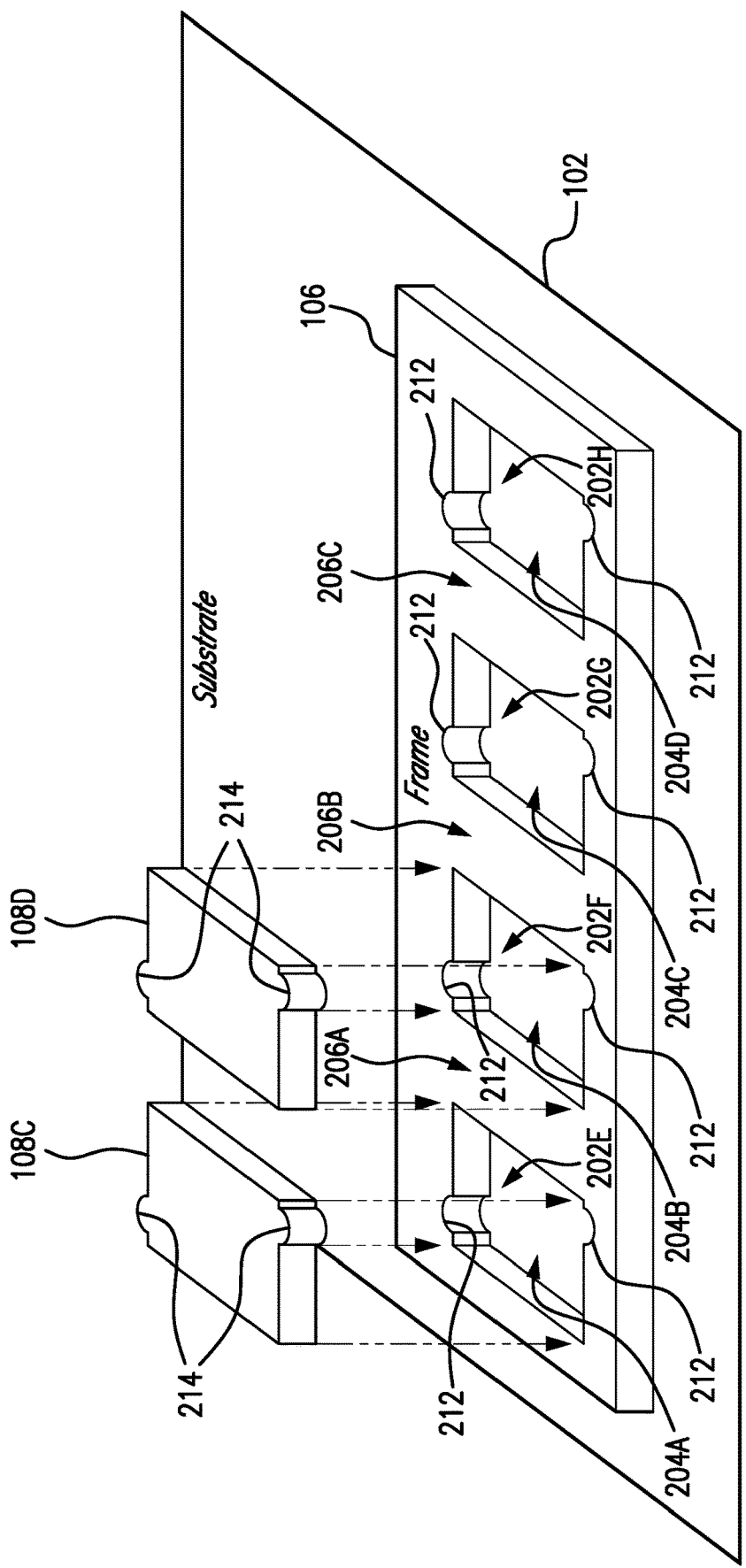

FIG. 2B illustrates an example socket locating technique using the system 100 of FIG. 1. Like in the example of FIG. 2A, the frame 106 is attached to the substrate 102. Additionally, the frame 106 defines one or more slots 202 that align with attachment locations 204 on the substrate 102. The example of FIG. 2B uses a different keying feature in the slots 202 and on the sockets 108 than that shown in the example of FIG. 2A.

As seen in FIG. 2B, the slots 202E, 202F, 202G, and 202H define notches 212 that extend into the frame 106. Additionally, the sockets 108C and 108D include protrusions 214 that extend from the sockets 108C and 108D. The notches 212 align with the protrusions 214 when the sockets 108C and 108D are properly positioned within the slots 202E and 202F. As a result, the notches 212 and the protrusions 214 assist in aligning the receptacles of the sockets 108C and 108D with the pads of the attachment locations 204A and 204B.

Although not illustrated, the sockets 108A, 108B, 108C, and 108D shown in FIGS. 2A and 2B may include any suitable features to accommodate devices 110 (e.g., optical circuits). For example, the sockets 108A, 108B, 108C, and 108D may define wells into which devices 110 may be inserted. The wells may have sidewalls that extend up the sides of the devices 110 to hold the devices 110 within the sockets 108A, 108B, 108C, and 108D. As a result, it may be more difficult for the devices 110 to dislodge or fall out of the sockets 108A, 108B, 108C, and 108D. Additionally, the sockets 108A, 108B, 108C, and 108D may define receptacles at the bottom of the wells. The receptacles may be sized, shaped, and arranged to receive pins of the devices 110. The pins may extend through the receptacles when the devices 110 are inserted into the sockets 108A, 108B, 108C, and 108D. The pins then connect to the pads of the attachment locations 204A, 204B, 204C, and 204D to form an electrical connection between the devices 110 and another device 104 coupled to the substrate 102.

Figure 2C:
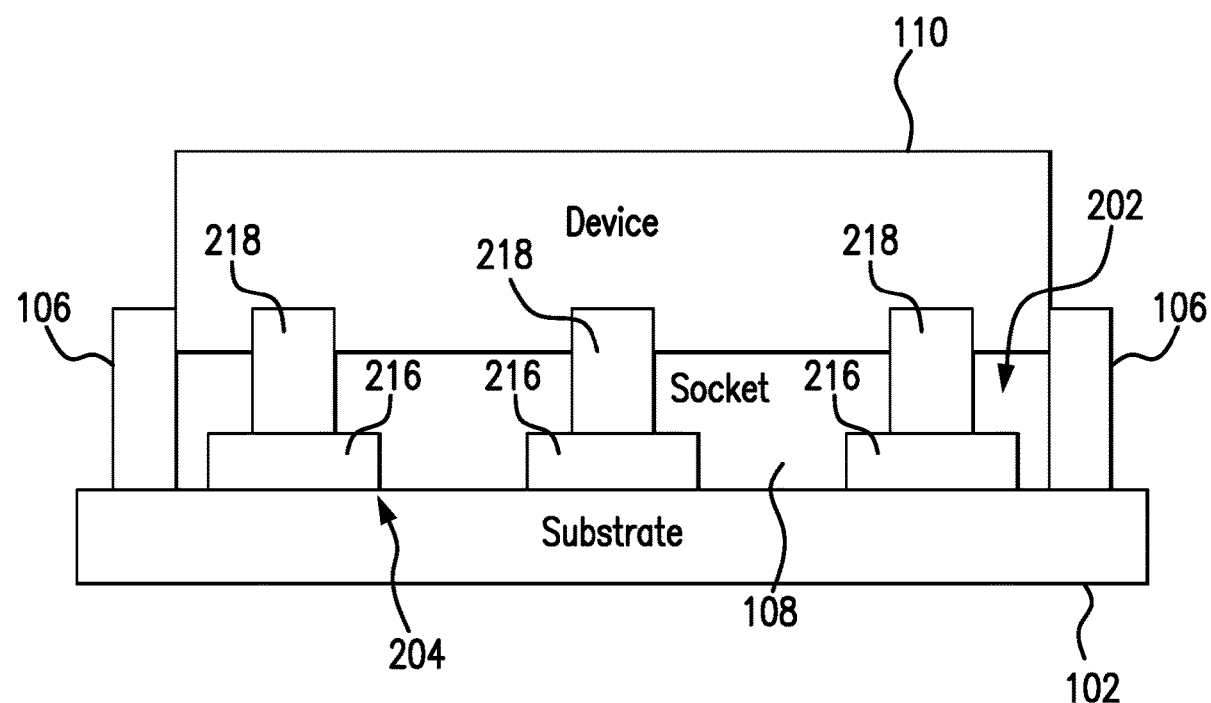

FIG. 2C illustrates an example socket locating technique using the system 100 of FIG. 1. As seen in FIG. 2C, a frame 106 is attached to a substrate 102. The frame defines a slot 202 that aligns with an attachment location 204 on the surface of the substrate 102. The attachment location 204 includes pads 216 on the surface of the substrate 102. A socket 108 is positioned within the slot 202 of the frame 106. Additionally, a device 110 is positioned in or on the socket 108. As seen in the example of FIG. 2C, the device 110 includes pins 218 that extend through receptacles in the socket 108 to connect to the pads 216 on the substrate 102. The frame 106 aligns the socket 108 with the pads 216. As a result, when the device 110 is positioned in the socket 108, the pins 218 of the device 110 connect to the pads 216 on the substrate 102.

As seen in FIG. 2C, the frame 106 may hold the socket 108 so that the socket 108 does not dislodge or fall out of the slot 202 defined by the frame 106. In some embodiments, the socket 108 holds the device 110 in place so that the device 110 does not dislodge or fall out of the socket 108. For example, the receptacles of the socket 108 may hold the device 110 and prevent the device 110 from easily dislodging or falling out of the socket 108. As another example, the socket 108 may include sidewalls that extend up the sides of the device 110 to hold the device 110 so that the device 110 does not easily dislodge or fall out of the socket 108.

When the pins 218 of the device 110 are connected to the pads 216 on the substrate 102, an electrical connection may be formed between the device 110 and another device 104 coupled to the substrate 102. Electrical signals may then be communicated between the device 110 and the other device 104. For example, if the device 110 is an optical circuit and the device 104 is an electrical switch die in a CPO device, then the optical circuit may convert electrical signals received from the electrical switch die into optical signals or convert received optical signals into electrical signals for the electrical switch die.

Figure 3:
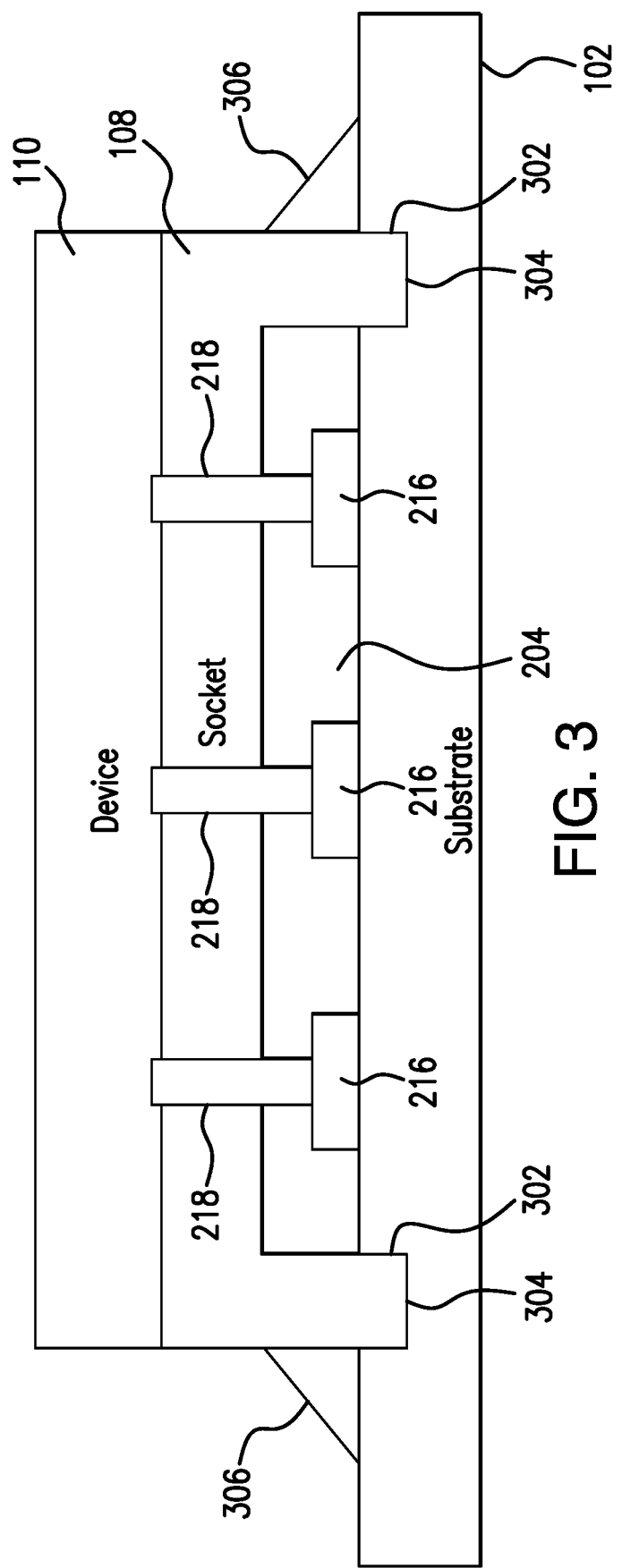
FIG. 3 illustrates an alternative socket locating technique that may be used in the system of FIG. 1.

FIG. 3 illustrates an alternative socket locating technique that may be used in the system 100 of FIG. 1. As seen in FIG. 3, grooves 302 in the substrate 102 are used to align a socket 108 with an attachment location 204. The grooves 302 may be formed in the substrate 102 through an etching, carving, or drilling process. The grooves 302 may not extend through the substrate 102, which may improve the mechanical integrity of the substrate 102 relative to forming a hole through the substrate 102.

The socket 108 includes pegs 304 that extend from the socket 108. The pegs 304 are sized, shaped, and arranged so that the pegs 304 align with the grooves 302 formed in the substrate 102 and fit within the grooves 302. As seen in FIG. 3, the pegs 304 align with the grooves 302 such that the pegs 304 mate with the grooves 302 when the socket 108 is properly aligned on the substrate 102. The socket 108 may include any suitable number of pegs 304 that align with any suitable number of grooves 302 formed in the substrate 102. When the pegs 304 mate with the grooves 302, the socket 108 is aligned with the pads 216 of the attachment location 204 on the substrate 102. In certain embodiments, the pegs 304 extend from the socket 108 such that when the pegs 304 are mated with the grooves 302 in the substrate 102, the pegs 304 hold the socket 108 above the attachment location 204 on the substrate 102. Additionally, the receptacles in the socket 108 are aligned with the pads 216 of the attachment location 204. In certain embodiments, the pegs 304 may be 125 microns long and located at the corners of the socket 108 (e.g., the four corners of a rectangular socket such that a corner and its opposite corner have pegs 304). The grooves 302 may extend 30 to 33 microns deep into the substrate 102. In embodiments where a solder mask is disposed on the substrate, the grooves 302 may extend through the solder mask, which may add 20 microns to the depth of the groove 302.

When a device 110 is positioned in or on the socket 108, the pins 218 of the device 110 extend through the receptacles on the socket 108 to connect to the pads 216 on the substrate 102. Thus, the grooves 302 and the pegs 304 properly align the socket 108, and the socket 108 aligns the device 110 with the pads 216 on the substrate 102. In some embodiments, the socket 108 holds the device 110 in place so that the device 110 does not dislodge or fall out of the socket 108. For example, the receptacles of the socket 108 may hold the device 110 and prevent the device 110 from easily dislodging or falling out of the socket 108. As another example, the socket 108 may include sidewalls that extend up the sides of the device 110 to hold the device 110 so that the device 110 does not easily dislodge or fall out of the socket 108.

When the pins 218 of the device 110 are connected to the pads 216 on the substrate 102, an electrical connection may be formed between the device 110 and another device 104 coupled to the substrate 102. Electrical signals may then be communicated between the device 110 and the other device 104. For example, if the device 110 is an optical circuit and the device 104 is an electrical switch die in a CPO device, then the optical circuit may convert electrical signals received from the electrical switch die into optical signals or convert received optical signals into electrical signals for the electrical switch die.

In some embodiments, an adhesive 306 is applied to the outer surface of the socket 108 (e.g., on the pegs 304) to hold the pegs 304 in the grooves 302. For example, an epoxy or solder may be applied to the pegs 304 to fasten or hold the peg 304 in the grooves 302. As a result, the adhesive 306 prevents the pegs 304 from falling out of the grooves 302, which maintains the connection between the pins 218 and the pads 216. The adhesive 306 may be deposited around the pegs 304 before or after the pegs 304 are positioned within the grooves 302.

Figure 4:
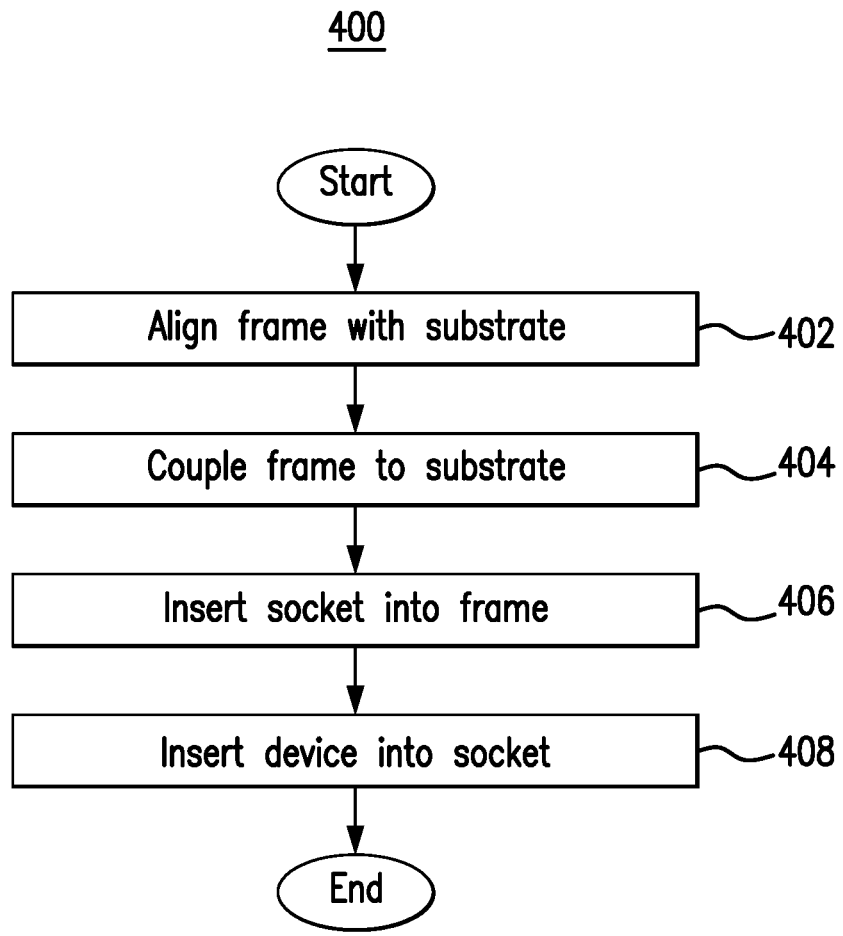
FIG. 4 is a flowchart of an example method to form a portion of the system of FIG. 1.

FIG. 4 is a flowchart of an example method 400 to form a portion of the system 100 of FIG. 1. In particular embodiments, a manufacturing machine or an operator of the machine performs the method 400. By performing the method 400, a socket 108 is properly aligned with the substrate 102 using a frame 106.

In block 402, the manufacturing machine aligns the frame 106 (e.g., a plastic frame) with the substrate 102. The frame 106 may define one or more slots 202. When the frame 106 is properly aligned with the substrate 102, the slots 202 align with attachment locations 204 on the surface of the substrate 102. Each of the attachment locations 204 may include pads 216 that connect to electrical connections or traces on or through the substrate 102.

In block 404, the manufacturing machine couples the frame 106 to the substrate 102. In some embodiments, an epoxy or solder is used to couple the frame 106 to the substrate 102. For example, epoxy may be deposited on a bottom surface of the frame 106 before positioning the frame 106 onto the substrate 102. When the epoxy cures, the frame 106 becomes bonded to the substrate 102.

In block 406, the manufacturing machine inserts a socket 108 into the frame 106. The socket 108 may be inserted into a slot 202 defined by the frame 106. In some embodiments, the slot 202 and the socket 108 may include keying features that assist in the proper alignment of the socket 108 within the slot 202. When the socket 108 is properly positioned within the slot 202, the receptacles in the socket 108 align with the pads 216 of the attachment location 204 that aligns with the slot 202.

As shown in FIGS. 2A and 2B, the frame 106 may include protrusions 208 that extend into the slots 202 or notches 212 that extend into the frame 106 from the slots 202. Sockets 108 that may be inserted into the slots 202 may include notches 210 that extend into the sockets 108 or protrusions 214 that extend from the sockets 108. The notches 210 may mate with the protrusions 208 when the sockets 108 are inserted into the slots 202. The protrusions 214 may mate with the notches 212 when the sockets 108 are inserted into the slots 202. As a result, the notches and the sockets assist in the alignment of the sockets 108 with the slots 202. For example, if a socket 108 is not properly aligned within a slot 202, the notches and protrusions may not mate, and the socket 108 may not seat within the slot 202. If the socket 108 is properly aligned within the slot 202, the notches and protrusions may mate, and the socket may seat within the slot 202.

In block 408, the manufacturing machine inserts a device 110 into the socket 108. Because the socket 108 is properly positioned within the slot 202 of the frame 106, the pins of the device 110 extend through the receptacles of the socket 108 to connect to the pads 216 of the attachment location 204 on the surface of the substrate 102. As a result, an electrical connection is formed between the device 110 and the pads 216 of the substrate 102.

The socket 108 may include any suitable features to accommodate the device 110 (e.g., optical circuits). For example, the socket 108 may define a well into which device 110 may be inserted. The well may have sidewalls that extend up the sides of the device 110 to hold the device 110 within the socket 108. As a result, it may be more difficult for the device 110 to dislodge or fall out of the socket 108. Additionally, the socket 108 may define receptacles at the bottom of the well. The receptacles may be sized, shaped, and arranged to receive pins of the device 110. The pins may extend through the receptacles when the device 110 is inserted into the socket 108. The pins then connect to the pads of the attachment location 204 to form an electrical connection between the device 110 and another device 104 coupled to the substrate 102.

In some embodiments, the device 110 is an optical circuit that transmits or receives optical signals. For example, the optical circuit may receive an optical signal and convert that optical signal into an electric signal. The optical circuit then communicates the electric signal to the device 104, which may be an electrical switch die, over the electrical connection formed between the device 104 and the device 110 on or through the substrate 102. As another example, the optical circuit may receive electric signals from the device 104. The optical circuit may convert the electric signals into optical signals and transmit the optical signals to an external system.

Figure 5:
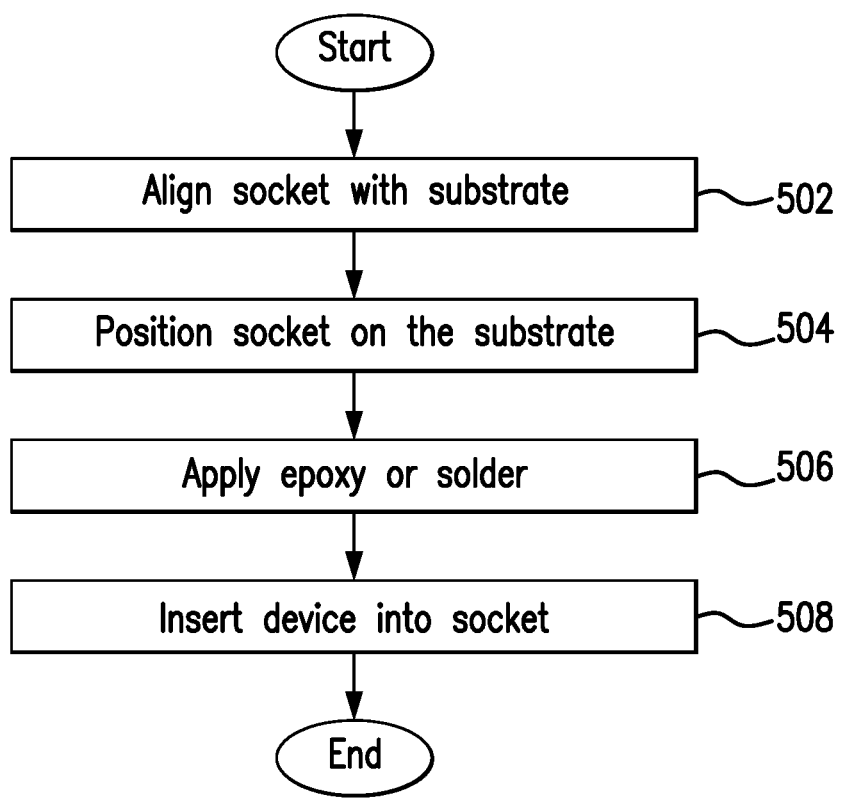
FIG. 5 is a flowchart of an example method to form a portion of the system of FIG. 1.

FIG. 5 is a flowchart of an example method 500 to form a portion of the system 100 of FIG. 1. In particular embodiments, a manufacturing machine or an operator of the manufacturing machine performs the method 500. By performing the method 500, a socket 108 is properly aligned with an attachment location 204 on a substrate 102.

In block 502, the manufacturing machine aligns the socket 108 with the substrate 102. Grooves 302 may have been formed in the substrate 102 through an etching or drilling process. The socket 108 may include pegs 304 that extend from the socket 108. The grooves 302 may be shaped, sized, or arranged to mate with the pegs 304 extending from the socket 108. Additionally, the grooves 302 may be positioned on the substrate 102 such that the socket 108 aligns with an attachment location 204 on the substrate 102 when the pegs 304 mate with the grooves 302. The pegs 304 may be positioned within the grooves 302 to align the socket 108 with the attachment location 204 on the surface of the substrate 102. As a result, the grooves 302 and the pegs 304 align the socket 108 with the substrate 102.

In block 504, the manufacturing machine positions the socket 108 on the substrate 102. For example, the manufacturing machine may insert the pegs 304 into the grooves 302 of the substrate 102 so that the pegs 304 mate with the grooves 302. The pegs 304 may be shaped, sized, or arranged to mate with the arrangement of grooves 302 on the substrate 102. When the pegs 304 of the socket 108 are seated with in the grooves 302 of the substrate 102, the socket 108 is properly positioned on the substrate 102. In certain embodiments, the pegs 304 extend from the socket 108 such that when the pegs 304 are mated with the grooves 302 in the substrate 102, the pegs 304 hold the socket 108 above the attachment location 204 on the substrate 102. Additionally, the receptacles in the socket 108 are aligned with the pads 216 of the attachment location 204.

In block 506, the manufacturing machine applies epoxy or solder to the pegs 304 to hold the pegs 304 within the grooves 302. As a result, the epoxy or solder prevents the pegs 304 from falling out of the grooves 302. The epoxy or solder may be deposited around the pegs 304 before or after the pegs 304 are positioned within the grooves 302.

In block 508, the manufacturing machine inserts an device 110 into the socket 108. Because the socket 108 is aligned with the attachment location 204 of the substrate 102, the pins 218 of the device 110 extend through receptacles in the socket 108 to connect to the pads 216 of the attachment location 204. As a result, an electrical connection is formed between the device 110 and the pads 216 on the substrate 102. Stated differently, when a device 110 is positioned in or on the socket 108, the pins 218 of the device 110 extend through the receptacles on the socket 108 to connect to the pads 216 on the substrate 102. Thus, the grooves 302 and the pegs 304 properly align the socket 108, and the socket 108 aligns the device 110 with the pads 216 on the substrate 102. In some embodiments, the socket 108 holds the device 110 in place so that the device 110 does not dislodge or fall out of the socket 108. For example, the receptacles of the socket 108 may hold the device 110 and prevent the device 110 from easily dislodging or falling out of the socket 108. As another example, the socket 108 may include sidewalls that extend up the sides of the device 110 to hold the device 110 so that the device 110 does not easily dislodge or fall out of the socket 108.

In certain embodiments, the manufacturing machine may be a pick and place bonder that can accurately position components (e.g., the frame 106, the socket 108, and the devices 104 and 110) onto the substrate 102. For example, the pick and place bonder may have an accuracy within ten microns. Additionally, the pick and place bonder may perform epoxy bonding (e.g., use epoxy to bond the frame 106 to the substrate 102 or use epoxy to bond the peg 304 of the socket 108 within the groove 302). In some embodiments, the pick and place bonder maintains the position of the components and the substrate 102 throughout the epoxy cure process using solder mask trenches or removal of a single layer of the substrate 102 (e.g., using the grooves 302). The pick and place bonder may use ultraviolet radiation to cure the epoxy after the pick and place bonder has dispensed the epoxy.

In summary, various techniques that do not require holes to be formed through a substrate may be used to align one or more sockets with the substrate. In a first technique, a frame attached to the substrate defines slots in which sockets may be inserted. The slots may include keying features that assist in aligning the sockets within the slots. In a second technique, grooves are formed in the surface of the substrate. A socket includes pegs that mate with the grooves when the socket is properly aligned with the substrate. Epoxy or solder may hold the pegs within the grooves.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An apparatus comprising:
   a substrate;
   a frame defining a first slot and a second slot separated by a rail, wherein the frame is coupled to the substrate such that the first slot is aligned with a first attachment location on the substrate and the second slot is aligned with a second attachment location on the substrate;
   a first socket arranged to receive a first device, wherein the first socket aligns with the first attachment location on the substrate when the first socket is inserted in the first slot; and
   a second socket arranged to receive a second device, wherein the second socket aligns with the second attachment location on the substrate when the second socket is inserted in the second slot.

2. The apparatus of claim 1, wherein the frame comprises a protrusion into the first slot and wherein the first socket defines a notch that aligns with the protrusion when the first socket is positioned in the slot.

3. The apparatus of claim 1, wherein the frame further defines a notch and wherein the first socket comprises a protrusion that aligns with the notch when the first socket is positioned in the first slot.

4. The apparatus of claim 1, wherein the attachment location comprises pads and wherein the first device connects to the pads when the first device is positioned in the first socket and when the first socket is positioned in the first slot.

5. The apparatus of claim 1, wherein the frame is adhered to the substrate using epoxy.

6. The apparatus of claim 1, wherein the frame comprises a rail that separates the first slot from the second slot.

7. The apparatus of claim 1, wherein the first device comprises an optical circuit arranged to receive an optical signal.

8. The apparatus of claim 1, further comprising the first device and a third device coupled to the substrate, wherein the first device connects with the third device when the first device is positioned within the first socket.

9. An apparatus comprising:
- a substrate defining a first groove and a second groove in a surface of the substrate;
- a first socket arranged to receive a first device, the first socket comprising a first peg, wherein the first socket aligns with a first attachment location on the substrate when the first peg mates with the first groove;
- a second socket arranged to receive a second device, the second socket comprising a second peg, wherein the second socket aligns with a second attachment location on the substrate when the second peg mates with the second groove; and
- at least one of epoxy or solder arranged to hold the first peg in the first groove.

10. The apparatus of claim 9, wherein at least one of the epoxy or the solder is disposed on an outer surface of the first socket.

11. The apparatus of claim 9, wherein the substrate further defines a third groove and the first socket further defines a third peg and wherein the first socket aligns with the first attachment location on the substrate when the third peg is positioned in the third groove.

12. The apparatus of claim 11, wherein the third peg is located at an opposite corner of the first socket from the first peg.

13. The apparatus of claim 9, wherein the first attachment location comprises pads and wherein the first device connects to the pads when the first device is positioned in the first socket and when the first peg is positioned in the first groove.

14. The apparatus of claim 9, wherein the first device comprises an optical circuit arranged to receive an optical signal.

15. The apparatus of claim 9, further comprising the first device and a third device coupled to the substrate, wherein the first device connects with the third device when the first device is positioned within the first socket.

16. An apparatus comprising:
- a substrate;
- a first device coupled to the substrate;
- a frame defining a first slot and a second slot, wherein the frame is coupled to the substrate such that the first slot is aligned with a first attachment location on the substrate and such that the second slot is aligned with a second attachment location;
- a first socket inserted in the first slot such that the first socket aligns with the first attachment location on the substrate;
- a second socket inserted in the second slot such that the second socket aligns with the second attachment location on the substrate; and
- a second device inserted in the first socket such that the second device is electrically connected to the first device.

17. The apparatus of claim 16, wherein the frame comprises a protrusion into the first slot and wherein the first socket defines a notch that aligns with the protrusion when the first socket is positioned in the first slot.

* * * * *